United States Patent
Roh et al.

(10) Patent No.: US 7,340,414 B2
(45) Date of Patent: Mar. 4, 2008

(54) REFRIGERATOR HAVING AUTOMATIC FOOD ORDERING FUNCTION AND METHOD FOR OPERATING THE SAME

(75) Inventors: Young Hoon Roh, Seoul (KR); Jung Ho Kim, Koyang-si (KR); Kwang Choon Kim, Kwangmyung-si (KR); Jin Chul Cho, Kwangmyung-si (KR)

(73) Assignee: LG Electronics Inc., Seoul (KR)

( * ) Notice: Subject to any disclaimer, the term of this patent is extended or adjusted under 35 U.S.C. 154(b) by 687 days.

(21) Appl. No.: 10/134,695

(22) Filed: Apr. 30, 2002

(65) Prior Publication Data

US 2002/0178066 A1    Nov. 28, 2002

(30) Foreign Application Priority Data

May 25, 2001  (KR) ............................... 2001-29055
May 25, 2001  (KR) ............................... 2001-29056

(51) Int. Cl.
*G06Q 20/00*   (2006.01)
(52) U.S. Cl. ........................................ 705/23; 340/595
(58) Field of Classification Search ................. 705/23, 705/25, 22, 26, 27; 340/595
See application file for complete search history.

(56) References Cited

U.S. PATENT DOCUMENTS 6,636,151 B2 * 10/2003 Busick ..................... 340/521
6,735,479 B2 * 5/2004 Fabian et al. ............... 607/60
2002/0026325 A1 * 2/2002 Hirahara et al. ............. 705/1
2002/0157411 A1 * 10/2002 Ishikawa et al. ........... 62/231

FOREIGN PATENT DOCUMENTS

| DE | 3923509 A | * | 1/1991 |
| JP | 2000-222476 | | 8/2000 |
| KR | 1020000039121 | | 7/2000 |
| KR | 1020010003962 | | 1/2001 |
| KR | 1020010003969 | | 1/2001 |

OTHER PUBLICATIONS

Korean Office Action Dated Aug. 27, 2003 and Korean Office Action Dated Sep. 13, 2005.

* cited by examiner

*Primary Examiner*—Ronald Laneau
(74) *Attorney, Agent, or Firm*—Ked & Associates, LLP

(57) ABSTRACT

A refrigerator capable of transmitting and receiving information over a network and having an automatic food ordering function and a method for operating the same, wherein the residual amounts of food articles stored in containers of the refrigerator are measured through sensors installed in the containers and then displayed on a screen of a display unit, thereby enabling a user to easily recognize the residual amounts of the food articles stored in the refrigerator without opening the door of the refrigerator. The measured residual amounts of the food articles are compared with minimum proper amounts of the food articles preset by the user, respectively. In the case where the measured residual amount of a specific one of the food articles is smaller than the minimum proper amount of the specific food article, the specific food article is automatically ordered and delivered.

26 Claims, 4 Drawing Sheets

REFRIGERATOR HAVING AUTOMATIC FOOD ORDERING FUNCTION AND METHOD FOR OPERATING THE SAME

BACKGROUND OF THE INVENTION

1. Field of the Invention

The present invention relates to a refrigerator having an automatic food ordering function and a method for operating the same, and more particularly to a refrigerator having an automatic food ordering function and a method for operating the same, wherein the residual amounts of food articles in containers of the refrigerator are measured through sensors installed in the containers, and the food articles are automatically purchased over the Internet when the measured residual amounts are smaller than minimum proper amounts.

2. Description of the Related Art

In general terms, a refrigerator is a food storage case having a space for storage of food therein, and is adapted to cool its interior by use of electricity, gas, ice, etc. and thermally isolate the interior from its exterior by means of a thermal insulator, so as to store food at a low temperature while preserving it from decay.

An Internet-based refrigerator has recently been developed and widely used which has an online connection function in addition to a basic function of merely storing food at a certain temperature to keep it fresh. This Internet-based refrigerator functions as a Web pad for transmitting and receiving data to/from an external network over the Internet. To this end, the refrigerator comprises an input unit for receiving a command input from a user, and a display unit for outputting data through its screen.

The Internet-based refrigerator further comprises network connection means for transmitting and receiving data to/from the external network over the Internet, and a network microcomputer for processing data inputted through a key operation of the user and transmitting and receiving the processed data and external network data associated therewith through the network connection means. Through this construction of the refrigerator, the user can acquire desired information.

Further, through the display unit mounted on the outer surface of the refrigerator, such as a PDP, information regarding an internal state of the refrigerator can be displayed on the screen, as well as data transmitted and received to/from the external network connected to the Internet. As a result, the user need not personally open the door of the refrigerator to check the internal state of the refrigerator, resulting in prevention of unnecessary power consumption.

However, although the user can recognize the internal state of the refrigerator through the display unit as mentioned above, he/she cannot recognize the residual amount of food in a food package, such as a milk package, as long as he/she does not personally open the food package. For this reason, the user has the trouble of personally opening the food package to check the amount of food remaining therein. Furthermore, after checking the residual amount of food in the refrigerator, the user must separately operate a networking function provided in the refrigerator to gain access to the Internet and then order desired food to be purchased, or personally purchase the desired food offline.

SUMMARY OF THE INVENTION

Therefore, the present invention has been made in view of the above problems, and it is an object of the present invention to provide a refrigerator having an automatic food ordering function and a method for operating the same, wherein storage start dates and the residual amounts of articles of food stored in containers of the refrigerator, such as trays or home bars, are sensed through sensors installed in the containers and directly shown to a user through a display unit mounted on the outer surface of the refrigerator, so that the user can readily recognize the residual amount of food in the refrigerator, and, if the residual amounts of food articles in the containers are smaller than predetermined minimum proper amounts, the food articles are automatically ordered over the Internet and delivered to the user's home.

In accordance with one aspect of the present invention, the above and other objects can be accomplished by the provision of a refrigerator having an automatic food ordering function, comprising: network connection means for transmitting and receiving data to/from an external network over the Internet; a network microcomputer for processing data inputted through a key operation of a user and transmitting and receiving the processed data and external network data associated therewith through the network connection means; a display unit installed in the front of the refrigerator for outputting an image signal through its screen; at least one container formed in the refrigerator for storing at least one type of food article; at least one sensor installed in the container for sensing the residual amount of the food article stored in the container; and a controller for displaying the residual amount of the food article sensed through the sensor on the screen of the display unit when it is smaller than a predetermined minimum proper amount of the food article.

In accordance with another aspect of the present invention, there is provided a method for operating a refrigerator having an automatic food ordering function, comprising the steps of: a) setting a minimum proper amount of at least one type of food article stored in at least one container of the refrigerator; b) measuring a current residual amount of the food article stored in the container; c) comparing the residual amount of the food article measured at the step b) with the minimum proper amount set at the step a) to determine whether the measured residual amount is smaller than the minimum proper amount; and d) automatically ordering the food article over a network if it is determined at the step c) that the measured residual amount is smaller than the minimum proper amount.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
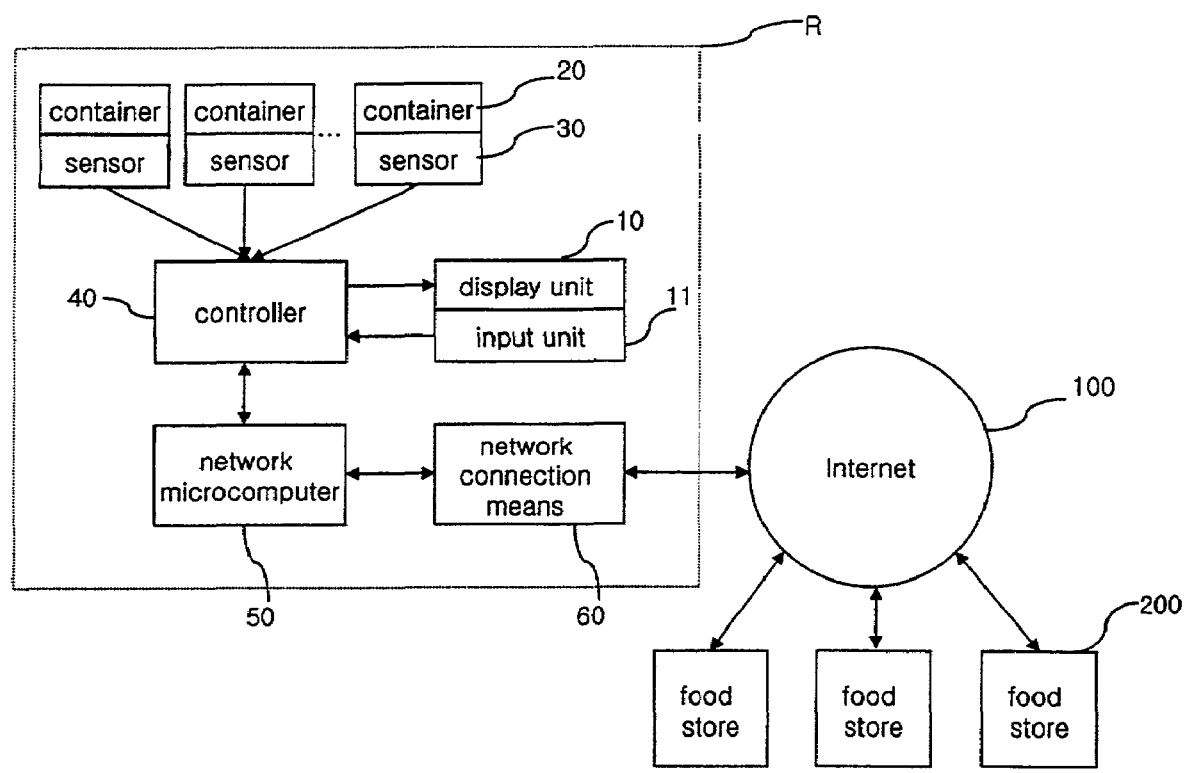
FIG. 1 is a block diagram showing the construction of a refrigerator having an automatic food ordering function in accordance with the present invention, which is connectable to the Internet via network connection means.

With reference to FIG. 1, there is shown in block form the construction of a refrigerator having an automatic food ordering function in accordance with the present invention, which is connectable to the Internet via network connection means.

As shown in FIG. 1, the refrigerator according to the present invention comprises containers 20 which are food storage spaces formed in specific locations inside of the refrigerator. The containers 20 are able to individually and separately store food articles like an egg tray 20a or home bar 20b and support the respective food articles by means of supports 21.

Sensors 30 are installed on the bottoms of the containers 20 to measure the residual amounts of food articles stored in the containers 20.

A controller 40 is provided to compare the current residual amounts of food articles measured through the sensors 30 with predetermined minimum proper amounts to determine whether the measured residual amounts are smaller than the predetermined minimum proper amounts. Upon determining that the measured residual amounts are smaller than the predetermined minimum proper amounts, the controller 40 generates a food purchase request control signal to automatically order the food articles.

Further, the controller 40 outputs an image signal regarding the measured food article amounts to a screen of a display unit 10 mounted on the outer surface of the refrigerator. For example, in the case where the residual amount of a specific food article is smaller than a minimum proper amount preset by the user, the controller 40 displays a window for automatic ordering of the specific food article on the screen, thereby enabling a user to determine whether to automatically order the specific food article.

The display unit 10 acts to display an image on the screen in response to a control command from the controller 40. The display unit 10 may preferably include a touch pad through which the user can select or input data.

An input unit 11 allows the user to input a food purchase command on the basis of an image displayed on the screen of the display unit 10. The input unit 11 may be, for example, a mouse, keyboard or the like.

A network microcomputer 50 is adapted to receive a food purchase request control command from the controller 40 and transmit a food purchase request command to a corresponding one of external food stores 200 so that a corresponding food article from the corresponding food store can be delivered to the user's home.

Network connection means 60 is adapted to connect the network microcomputer 50 to the Internet 100 to which the food stores 200 are in turn connected.

Namely, in the case where the residual amount of a specific food article stored in a specific one of the containers 20 is smaller than a minimum proper amount preset by the user, the controller 40 transfers a food purchase request control command to the network microcomputer 50 installed in the refrigerator R, which then transmits a food purchase request command to a corresponding one of the food stores 200 via the network connection means 60. As a result, the specific food article is delivered from the corresponding food store to the user's home.

Figure 2:
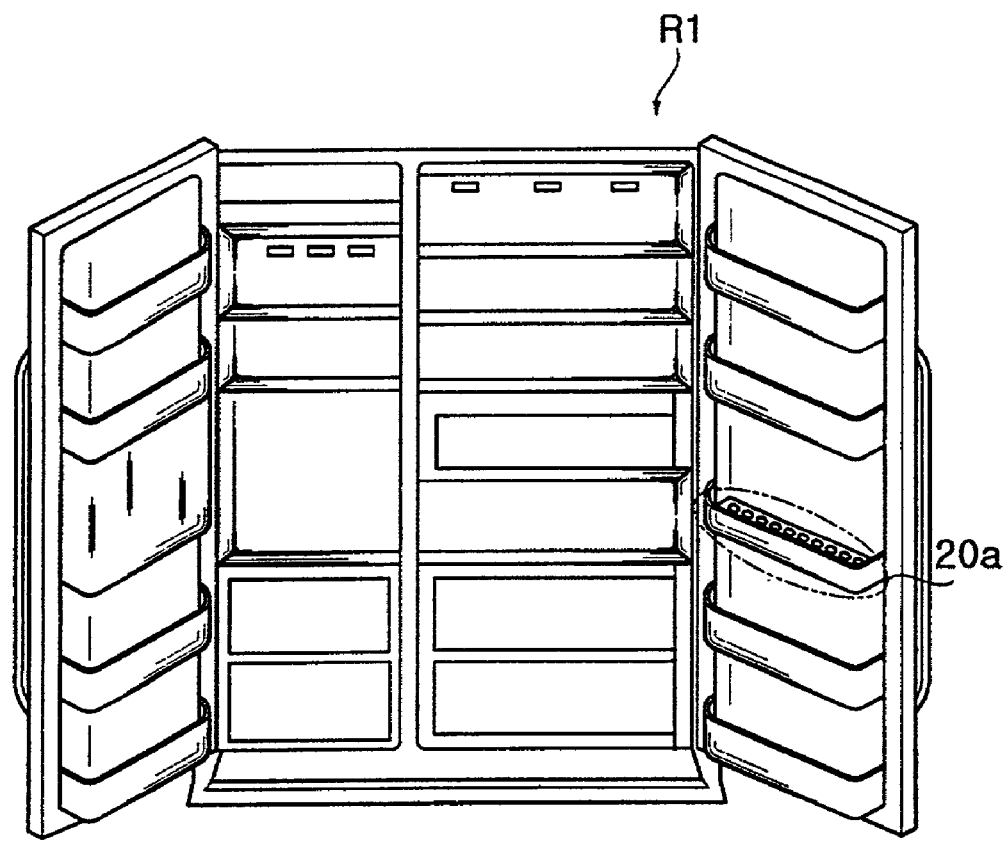
FIG. 2 is a front view showing an example of an internal structure of the refrigerator having an egg tray.
Figure 3:
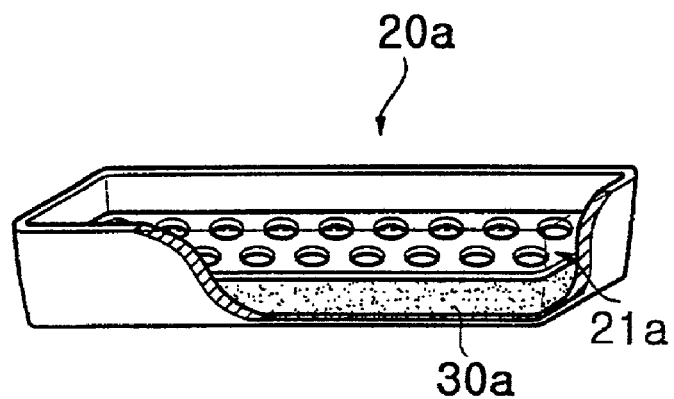
FIG. 3 is a perspective view of the egg tray.

FIGS. 2 and 3 show the egg tray 20a as an example of the containers of the refrigerator having the automatic food ordering function in accordance with the present invention. As shown in FIG. 2, the egg tray 20a is installed in a desired location inside the refrigerator door. As shown in FIG. 3, the egg tray 20a includes an egg support 21a having a plurality of holes for fixing eggs therein. A plurality of sensors 30a are installed on the bottom of the egg tray 20a at positions corresponding respectively to the holes of the support 21a.

In operation, the sensors 30a installed under the egg support 21a sense the presence or absence, the number, and storage start dates of eggs stored in the egg tray 20a, and send the sensed results to the controller (not sown). Then, the controller generates an image control signal regarding the storage states of the eggs in the egg tray 20a and outputs the generated image control signal to the screen of the display unit (not shown) mounted on the outer surface of the refrigerator R1 such that the user can recognize the storage states of the eggs without opening the door of the refrigerator R1. Further, if the sensed egg number is smaller than a minimum proper number preset by the user, the controller displays an automatic purchase window on the screen of the display unit such that eggs can be delivered from an external food store (not shown).

Figure 4:
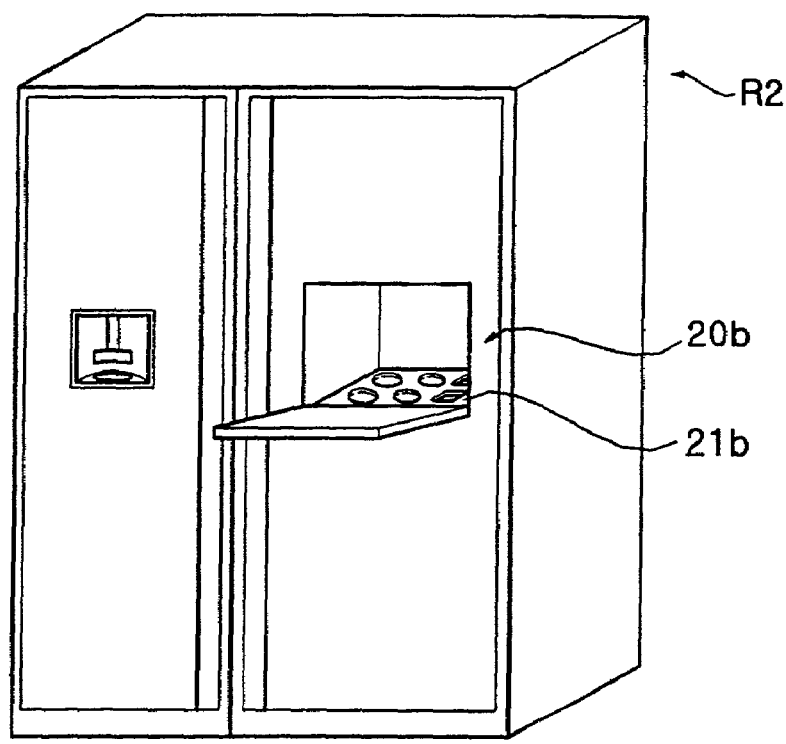
FIG. 4 is a front view showing another example of the internal structure of the refrigerator having a home bar.
Figure 5:
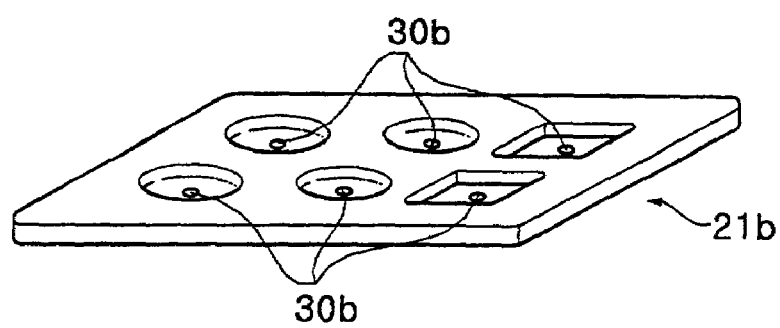
FIG. 5 is a perspective view of the home bar.

FIGS. 4 and 5 show the home bar 20b as another example of the containers of the refrigerator having the automatic food ordering function in accordance with the present invention. As shown in FIG. 4, the home bar 20b is installed in the front of the refrigerator in such a manner that it can be opened/closed. As shown in FIG. 5, the home bar 20b includes a support 21b having a plurality of recesses. A plurality of sensors 30b are installed in the recesses of the support 21b, respectively.

In other words, the home bar 20b is a separate container which is formed in the front of the door of the refrigerator R2 to easily store various drink articles quantitatively sold on the open market, such as beer, milk, juice, etc. The support 21b of the home bar 20b has a plurality of recesses that have the same sizes as those of bottles, cans, rectangular packages and the like to support associated drink articles, respectively. The sensors 30b are installed on the bottoms of or around the recesses of the support 21b, respectively. In operation, the sensors 30b sense the presence or absence and the residual amounts of bottle-type food articles, can-type food articles, rectangular package-type food articles, etc. stored in the corresponding recesses of the support 21b, respectively, and send the sensed results to the controller (not shown). Then, the controller generates an image control signal regarding the sensed results and outputs the generated image control signal to the screen of the display unit (not shown) such that the user can recognize the states of the food articles stored in the home bar 20b. Further, if the residual amount of any one of the food articles stored in the home bar 20b is less than a minimum proper amount preset by the user, the controller displays an automatic purchase window on the screen of the display unit such that the corresponding food article can be delivered from an external food store (not shown).

Each of the sensors may preferably be a piezoelectric sensor for sensing a pressure varying with the presence or absence of a stored food article, a photosensor for sensing the presence or absence of a stored food article by sensing the amount of incident light, or an electric sensor for sensing a voltage level generated when the bottom of the corresponding recess is depressed by the weight of a stored food article.

The above-described refrigerator having the automatic food ordering function is applicable to any containers capable of individually and separately storing specific food articles, as well as the egg tray and home bar.

Figure 6:
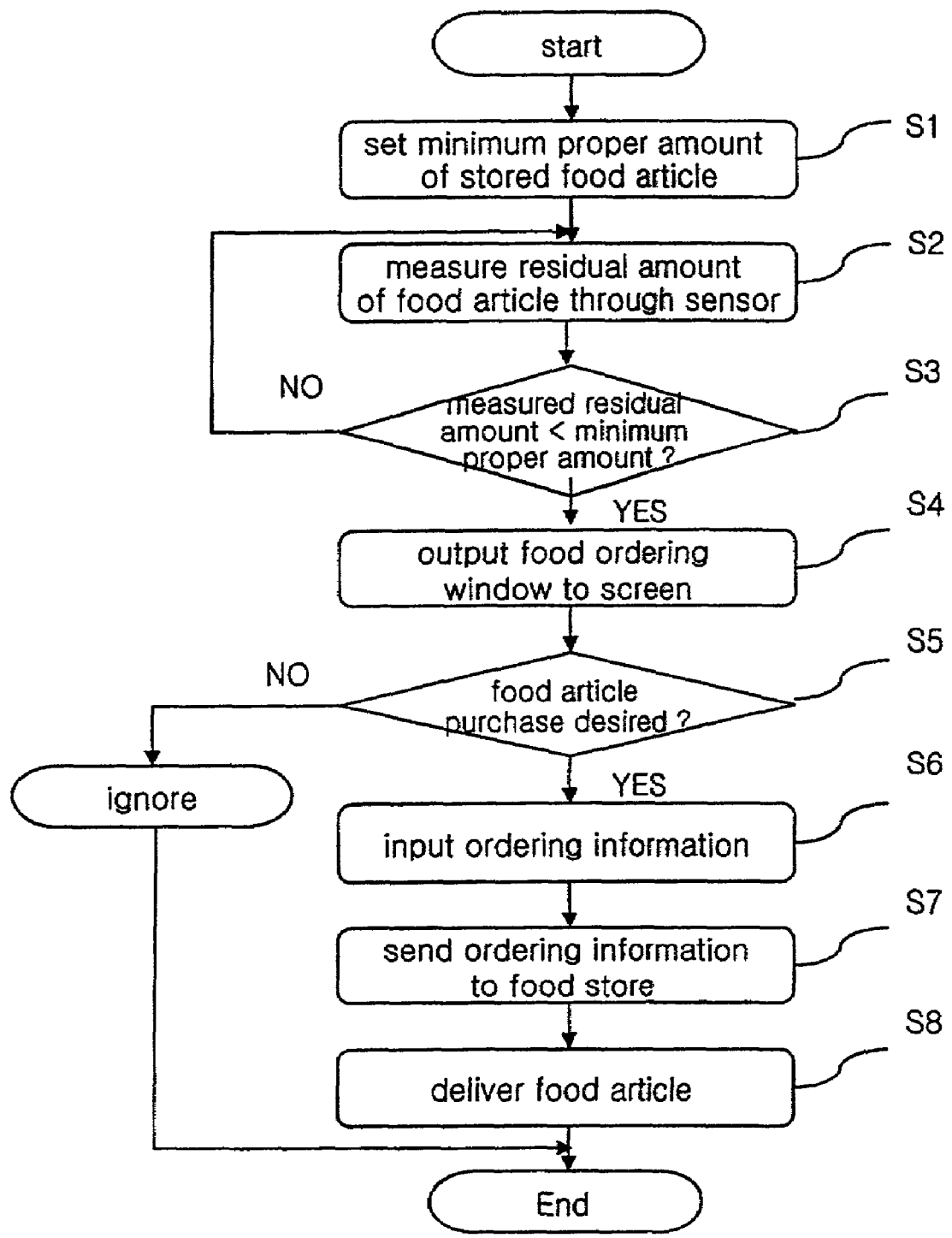
FIG. 6 is a flow chart illustrating the operation of the refrigerator having the automatic food ordering function in accordance with the present invention.

A description will hereinafter be given of the operation of the refrigerator with the above-stated construction in accordance with the present invention with reference to FIG. 6.

At the first step S1, the user sets a minimum proper amount of each food article in the controller of the refrigerator. The minimum proper amount is a reference value indicative of a point of time that the user must purchase a corresponding food article. Namely, the minimum proper amount is a reference value to be used at an automatic purchase step of the refrigerator according to the present invention.

At the second step S2, the residual amount of each food article is measured through at least one sensor installed in each container of the refrigerator.

At the third step S3, the controller compares the residual amount of each food article measured through the sensor at the second step S2 with the minimum proper amount of each food article set by the user at the first step S1 to determine whether the measured residual amount is smaller than the minimum proper amount.

If it is determined at the third step S3 that the measured residual amount of a specific one of the food articles is smaller than the minimum proper amount of the specific food article, then the controller requests the user to automatically purchase the specific food article at the fourth step.

The above fourth step includes a food ordering window output step S4 of outputting a food ordering window to the screen of the display unit, an automatic purchase determination step S5 of allowing the user to determine whether to automatically purchase the specific food article, an information input step S6 of inputting user information and food article information, a notification step S7 of sending the inputted user information and food article information to a food store over a network, and a food delivery step S8 of allowing the food store to deliver the specific food article to the user's home in response to the information sent at the notification step S7.

At the automatic purchase determination step S5, the user determines whether to automatically purchase the specific food article on the basis of the compared results of the third step S3 displayed on the screen of the display unit and the food ordering window displayed on the screen of the display unit at the food ordering window output step S4 when the measured residual amount of the specific food article is smaller than the minimum proper amount of the specific food article. If the user desires to automatically purchase the specific food article, then he/she will input a purchase command into the food ordering window displayed on the screen of the display unit by operating the input unit located in the display unit.

At the information input step S6, the user inputs through the input unit information regarding the number of the specific food article to be purchased, a type and brand of the specific food article, a delivery address and settlement means.

At the notification step S7, if the user determines the automatic purchase at the above automatic purchase determination step S5, the controller sends the purchase command and information inputted by the user to the network microcomputer, which in turn sends them to a food store connected to an external network such that the specific food article is delivered from the food store to the user's home.

At the food delivery step S8, the food store delivers the specific food article to the delivery address inputted at the above information input step S6 in response to the food purchase information sent from the network microcomputer over the network.

As an alternative, the information regarding the delivery address, the number of the food article to be purchased and the settlement means may be standardized and preset in the controller of the refrigerator. In this case, the information input step of inputting the information necessary for the food purchase and delivery will thus be omitted.

As a result, at the food purchase determination step, the user need not input any information necessary for the food delivery other than the food purchase command by operating the input unit.

In another embodiment, a command for purchasing the food article unconditionally, without asking the user his/her intention to purchase the food article when the results compared by the controller indicate that the measured residual amount of the specific food article is smaller than the minimum proper amount of the specific food article, may be preset in the controller. In this case, the automatic purchase determination step will be omitted.

As apparent from the above description, the present invention provides a refrigerator capable of transmitting and receiving information over a network and having an automatic food ordering function and a method for operating the same, wherein the residual amounts of food articles stored in containers of the refrigerator are measured through sensors installed in the containers and then displayed on a screen of a display unit, thereby enabling a user to easily recognize the residual amounts of the food articles stored in the refrigerator without opening the door of the refrigerator. The measured residual amounts of the food articles are compared with minimum proper amounts of the food articles preset by the user, respectively. In the case where the measured residual amount of a specific one of the food articles is smaller than the minimum proper amount of the specific food article, the specific food article is automatically ordered and delivered. Therefore, less time elapses from the food consumption to the food purchase, thus making it possible for the user to use the refrigerator more efficiently and conveniently.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A refrigerator having an automatic food ordering function, comprising:
   a network interface configured to transmit data to and receive data from an external network over the Internet;
   a network microcomputer configured to process data received from an input device and to transmit the processed data and external network data associated therewith through the network interface;
   a display provided at a front of the refrigerator and configured to display an image signal on a screen thereof;
   at least one container provided in the refrigerator and configured to receive at least one type of food article;
   at least one sensor provided in the container and configured to sense a residual amount of the food article stored in the container; and
   a controller configured to transmit a signal to the display related to the residual amount of the food article sensed by the sensor for display on the screen when the residual amount of the food article is less than a predetermined amount.

2. The refrigerator as set forth in claim 1, wherein the input device is configured to receive a food purchase command in response to the image signal displayed on the screen.

3. The refrigerator as set forth in claim 1, wherein the display includes a touch pad configured to input or select data.

4. The refrigerator as set forth in claim 1, wherein the container has at least one recess formed at a predetermined portion thereof, wherein a shape of the at least one recess corresponds to a shape of the food article.

5. The refrigerator as set forth in claim 1, wherein the sensor is adapted to sense at least one of a presence or an absence of the food article, or the residual amount of the food article stored in the container by sensing an amount of light being transmitted through the food article.

6. The refrigerator as set forth in claim 1, wherein the sensor is adapted to sense at least one of a presence or an absence of the food article or the residual amount of the food article stored in the container by sensing a variance in a voltage level associated with the food article.

7. The refrigerator as set forth in claim 1, wherein the sensor is adapted to sense at least one of a presence or an absence of the food article or the residual amount of the food article stored in the container by sensing a variance in a pressure associated with the food article.

8. The refrigerator as set forth in claim 1, wherein the controller is adapted to store previously input data related to the predetermined amount of the food article stored in the container.

9. The refrigerator as set forth in claim 1, wherein the controller is adapted to compare the residual amount of the food article sensed by the sensor with the predetermined amount and to send a food purchase request control signal to the network microcomputer when the sensed residual amount is smaller than the predetermined amount.

10. The refrigerator as set forth in claim 9, wherein the network microcomputer is adapted to send a food purchase request signal to an external food store over the Internet in response to the food purchase request control signal sent from the controller.

11. A method for operating a refrigerator having an automatic food ordering function, the method comprising:
   a) setting a reference amount of at least one type of food article stored in at least one container of the refrigerator;
   b) measuring a current amount of the food article stored in the container;
   c) comparing the current amount of the food article measured at step b) with the reference amount set at step a) to determine whether the current amount is less than the reference amount; and
   d) automatically ordering replacement food article over a network if it is determined at step c) that the current amount is less than the reference amount.

12. The method as set forth in claim 11, wherein step d) include:
   d-1) allowing a user to determine whether to automatically purchase the replacement food article.

13. The method as set forth in claim 12, wherein step d-1) includes:
   d-1-1) displaying a food ordering window on a display provided with the refrigerator to enable the user to order the replacement food article if it is determined at step c) that the current amount of the food article is less than the reference amount of the food article.

14. The method as set forth in claim 12, wherein step d) further include:
   d-2) inputting user information and food article information if the user authorizes an automatic purchase at step d-1)
   d-3) sending the user information and food article information inputted at step d-2) to a provider connected to the network; and d-4) authorizing the provider to deliver the replacement food article to the user's home in response to the information sent at step d-3).

15. The method as set forth in claim 14, wherein the user information inputted at step d-2) includes delivery address information and payment information, and the food article information inputted at step d-2) includes specifications related to the food article.

16. The refrigerator as set forth in claim 1, wherein the at least one container is at least one of an egg tray or a home bar.

17. A contents monitoring system for a refrigerator, comprising:
   at least one container provided in an interior of a refrigerator and configured to receive at least one storage item;
   at least one sensor coupled to the at least one container and configured to sense at least one physical characteristic associated with the at least one storage item received in the at least one container;
   a controller configured to receive a signal from the at least one sensor regarding the at least one physical characteristic associated with the at least one storage item, to compare the sensed at least one physical characteristic with a predetermined threshold established for the at least one physical characteristic, and to output a corresponding image signal if the at least one physical characteristic does not meet the predetermined threshold.

18. The system of claim 17, further comprising a display coupled to the refrigerator and configured to receive the image signal from the controller and to display the image signal thereon if the at least one physical characteristic does not meet the predetermined threshold.

19. The system of claim 18, further comprising a microprocessor coupled to the controller and a network interface coupled to the microprocessor, wherein the network interface is configured to transmit data to and receive data from an external network.

20. The system of claim 19, wherein the display is configured to be coupled to the microprocessor and the network interface, and wherein the display comprises a screen configured to display the image signal, and an input device configured to receive a purchase command in response to the image signal displayed on the screen and to transmit the purchase command to an external source through the microprocessor and the network interface.

21. The system of claim 20, wherein the at least one storage item comprises a food item stored in the refrigerator, and wherein the purchase command comprises a food purchase command to replenish a food item when a residual amount of the food item remaining in the container falls below the predetermined threshold.

22. The system of claim 18, wherein the display is provided on an outer surface of the refrigerator.

23. The system of claim 17, wherein the at least one container comprises at least one recess formed therein having a shape corresponding to the at least one storage item received therein.

24. The system of claim 17, wherein the at least one physical characteristic sensed by the sensor is at least one of a presence or an absence of the at least one storage item, or a weight of the at least one storage item.

25. The system of claim 24, wherein the sensor is configured to sense the at least one physical characteristic by sensing at least one of an amount of light transmitted through the at least one storage item, a voltage level variance associated with the at least one storage item, or a pressure variance associated with the at least one storage item.

26. A refrigerator comprising the system of claim 17.

* * * * *